(12) United States Patent
Beckmann et al.

(10) Patent No.: US 6,508,973 B2
(45) Date of Patent: Jan. 21, 2003

(54) PROCESS FOR MANUFACTURING AN ORNAMENTED PART

(75) Inventors: Andreas Beckmann, Hiddenhausen/Allemagne (DE); Eric Lecomte, Ardentes (FR)

(73) Assignee: Möllertech SAS, Le Buisson (FR)

( * ) Notice: Subject to any disclaimer, the term of this patent is extended or adjusted under 35 U.S.C. 154(b) by 47 days.

(21) Appl. No.: 09/783,790

(22) Filed: Feb. 15, 2001

(65) Prior Publication Data

US 2002/0043741 A1 Apr. 18, 2002

(30) Foreign Application Priority Data

Feb. 15, 2000 (FR) .............................................. 00 01819

(51) Int. Cl.$^7$ .............................................. B29C 53/04
(52) U.S. Cl. ........................ 264/480; 264/291; 264/296; 264/321; 264/479; 264/482
(58) Field of Search ................................ 264/321, 249, 264/479, 291, 400, 482, 511, 296, 480

(56) References Cited

U.S. PATENT DOCUMENTS

| | | | | |
|---|---|---|---|---|
| 4,244,900 A | * | 1/1981 | Heider | 264/46.1 |
| 4,463,861 A | * | 8/1984 | Tsubone et al. | 264/45.9 |
| 4,911,978 A | * | 3/1990 | Tsubone et al. | 156/285 |
| 4,968,474 A | * | 11/1990 | Ito | 264/321 |
| 5,425,484 A | * | 6/1995 | Kawand et al. | 224/32 R |
| 5,512,233 A | * | 4/1996 | Gallagher et al. | 264/321 |
| 5,562,873 A | * | 10/1996 | Tornero | 264/321 |
| 5,840,224 A | * | 11/1998 | Thary | 264/321 |
| 5,891,293 A | * | 4/1999 | Kelly et al. | 264/321 |

* cited by examiner

Primary Examiner—Allan R. Kuhns
(74) Attorney, Agent, or Firm—Duane Morris LLP

(57) ABSTRACT

An ink jet printhead has a number of nozzles each ejecting drops of ink toward a surface. Each nozzle has a nozzle chamber at least partially defined by an apertured roof portion operatively connected to an actuator such that the actuator moves the roof portion away from the surface to be printed to eject the ink. The ink jet printhead also has a projection within each nozzle for effectively dislodging any dried ink clogging the nozzle rim, hence preventing blocking of the nozzle.

9 Claims, 4 Drawing Sheets

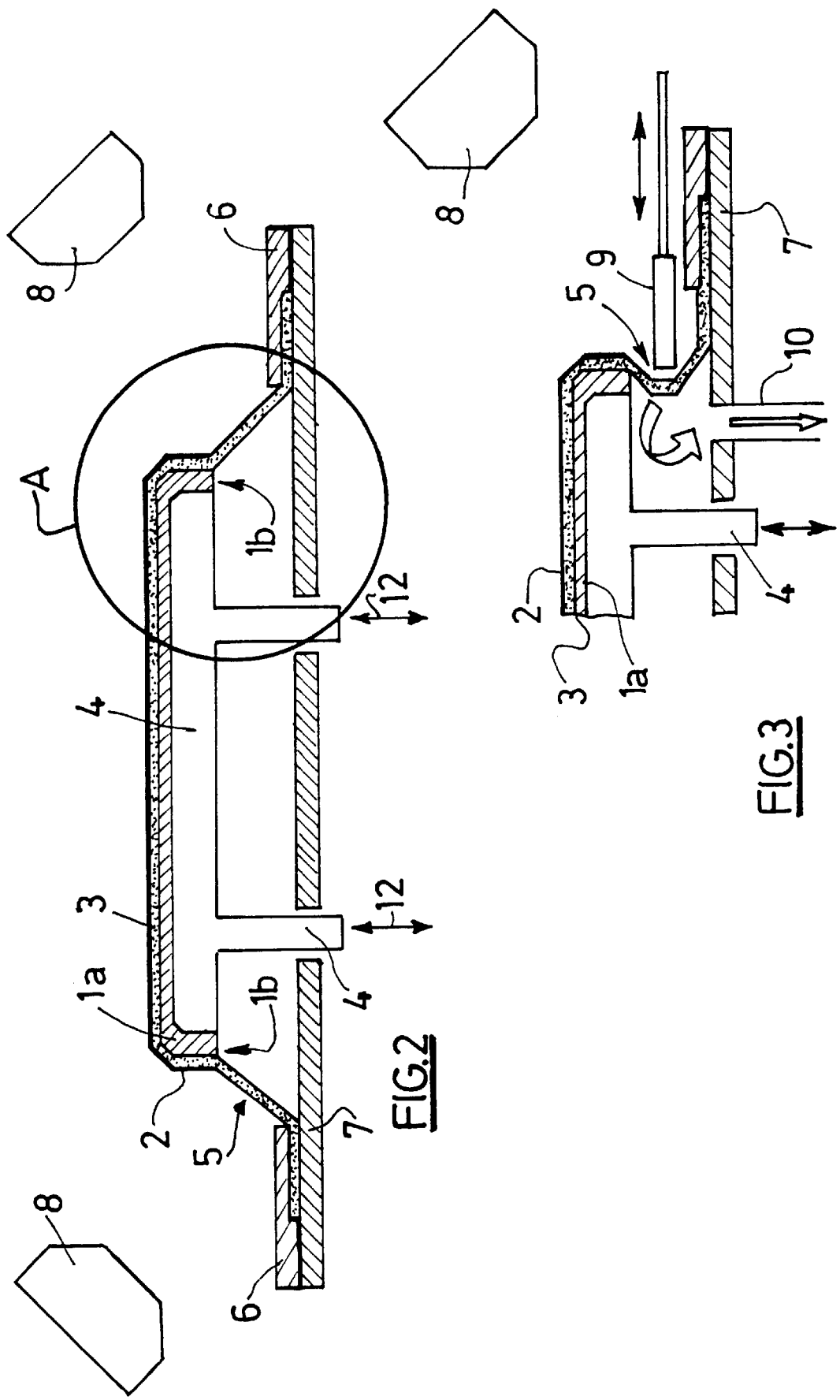

PROCESS FOR MANUFACTURING AN ORNAMENTED PART

FIELD OF THE INVENTION

The present invention relates to a process for manufacturing an ornamented part wherein a multilayer sheet of ornament with a back of foam is brought onto a support portion, the sheet of ornament comprising a back of foam and surrounding at least in an edge region of the support portion by the ornament, and to a device for carrying the process into effect.

BACKGROUND OF THE INVENTION

For the manufacture of parts with an upper surface that is ornamented, in particular by an ornamental material, the assembly must be worked, despite drawbacks, with a layer of foam. The part thus obtained must, in particular, have a good appearance when the foam thickness is comprised between 0.5 and 5 mm. For optical considerations, an acute angular passage or a transition with a maximum radius of 2 mm must remain on the limiting portions of the parts in the edge outer portion. This implies for the portion that, in the edge region, a bending by 90° or a bending back by 180° is necessary. In case the foamed underlayer covers the edges respectively in the lining region, the foam thickness will generate a greater or lesser radius, which is not desired if it is required to obtain an excellent lining completion.

SUMMARY OF THE INVENTION

The invention teaches a process and a device for manufacturing an ornamented part on which is brought a multilayer ornament formed of a back of foam and a sheet of ornament, on a support portion of the part, that it surrounds in the edge region with an acute angle or a maximum radius of 2 mm.

The process according to the invention for the manufacture of a part which is ornamented by applying an ornamental material comprising a back of foam is characterized in that:

in a first step, the ornament is brought onto the part and is maintained in the edge region;

then, in a second step, the foam thickness is reduced by heating in corresponding zone of the edge, then stretched ; and in a third step, the ornament assembly or the projecting sheet of ornament is fixed onto the part.

Preferably, the back of foam has a thickness comprised between 0.5 and 5 mm. Advantageously, the ornament or its projecting portion surrounds the edge region of the part with a maximum radius of 2 mm.

For enabling to make the lining, the foam thickness in said zone is reduced or removed by a laser and/or high frequency radiation and/or by heating and or stretching.

It is possible to provide that the ornament, or its projecting portion, in particular in the region of the angles and/or of the outline, and/or in the outline zone of the support portion of the part is stretched before and/or during the third step.

It may be provided that a suction is applied onto the back of foam on the portion to be lined, at the opposite of the ornament, and/or that a pressure is applied on the side of the sheet of ornament, at the opposite of the foam, in the third step.

Said zone, that surrounds the edge region may be stretched before the second or third step. Thus, it is possible to provide that said zone between the support portion of the part and the stretched zone of the ornament are heated and stretched by a mechanical slide member, before the second step, with respect to the support and displaced in the stretched edge region.

The invention relates also to a device for carrying out the process with a movable support plate for maintaining a part which must be ornamented and coated with a multilayer ornamental material in its support portion, the part comprising an edge region, a grasping apparatus for grasping and firmly maintaining the ornamental material in a edge area of the corresponding part and with a heating apparatus for heating the ornamental connection in the region of said zone.

It is possible to provide that the plate has a cup shaped support surface.

Advantageously, the plate is movably mounted inside the machine so that it forms a stretching means that is arranged in the body of the machine by which the grasping apparatus makes possible a return of the sheet.

In a preferred embodiment of the invention, a second plate is provided, also in the forming device, in front of the first plate and arranged so that the part to be ornamented is confined between the first and second plates in order that the support of the part is near the first plate and the ornament near the second plate.

The heating device may be on the side of the sheet and/or on the side of the layer of foam.

It is also possible to provide a movable auxiliary forming element for stretching the ends of the ornament between the grasping apparatus and the plate(s).

In an other embodiment of the invention, it is provided that, on the side of the first or second plate, a pressure tight chamber is arranged for acting by suction or pressure on the deformation of the zone between the grasping apparatus and the edge region of the part.

BRIEF DESCRIPTION OF THE DRAWINGS

Other features and advantages of the invention will appear during the following description of two particular embodiments, only given as non-limiting examples, with reference to the drawings, which show:

FIG. 2, the device of FIG. 1 in a working position

FIG. 3, the unit A of the device of FIG. 2 in a variant of embodiment;

DETAILED DESCRIPTION

Figure 1:
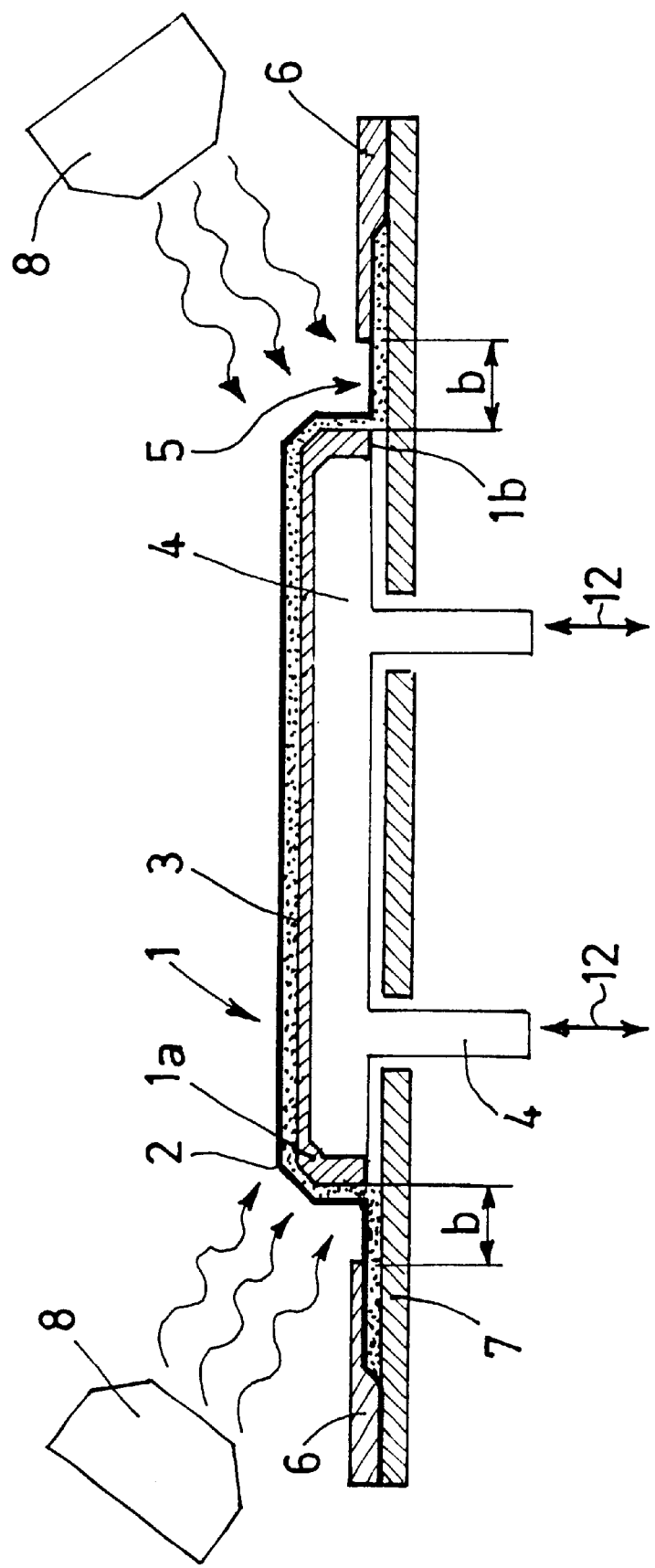
FIG. 1, a device for carrying out the process according to the invention in a rest position.

In FIG. 1, the ornament formed by a back of foam 3 and a sheet of ornament 2 is brought onto a support portion 1 a of the part to be ornamented with a thickness reduction of the back of foam by means of an energizing radiation, via a suitable apparatus 8, inside a peripheral zone 5 on a width <<b>>, whereby the zone 5 in the region of the edge 1b of the support 1a corresponds to an edge zone surrounded by the ornament. The region 1b, with its back of foam of a reduced thickness (so-called back of foam hereinafter) and the sheet of ornament will rest on the plate 4. It results therefrom that the ornament is gripped in the region between a machine table 7 and one or a plurality of grips 6.

Then, heating of the sheet of ornament 2 with the back of foam 3 is made in the zone 5 between the part 1 and the grips 6 with help of an energy source 8.

FIG. 2 shows the next step. After heating of the sheet 2 and the back of foam 3 in the zone 5, the plate is raised, with help of a drive (not shown) as diagrammatically illustrated by arrows 12, and its results therefrom a new reduction in thickness of the ornament 2, 3. This deformation may be made with or without a simultaneous heating via the energy source 8. An irradiation during the deformation movement depends upon the deformation speed and the thermal capacity of the ornamental material 2, 3, which enable to determine if the heating should be made or not, without deformation problems.

As illustrated in FIG. 3 which shows, at an enlarged scale, the encircled portion A of FIG. 2, in a variant of embodiment, it is possible during or after the forming steps, to call for an intermediary member such as a slide member or drawer 9 for shaping the sheet 2 and the foam 3 in the angle region, or for obtaining an outline. For obtaining such a deformation, with or without a simultaneous action of the slide member 9, it is possible to apply the ornament with a pressure or a suction in the region between the grips 6, the table 7, the part 1 and the ornament 2, 3, which constitutes a closed chamber 11 which may correspond with one or a plurality of apertures 10.

The lining of the ornament under the lower side of the region 1b of the part 1 may result from use of a mechanism such as the slide member 9, or may be made manually.

Figure 4:
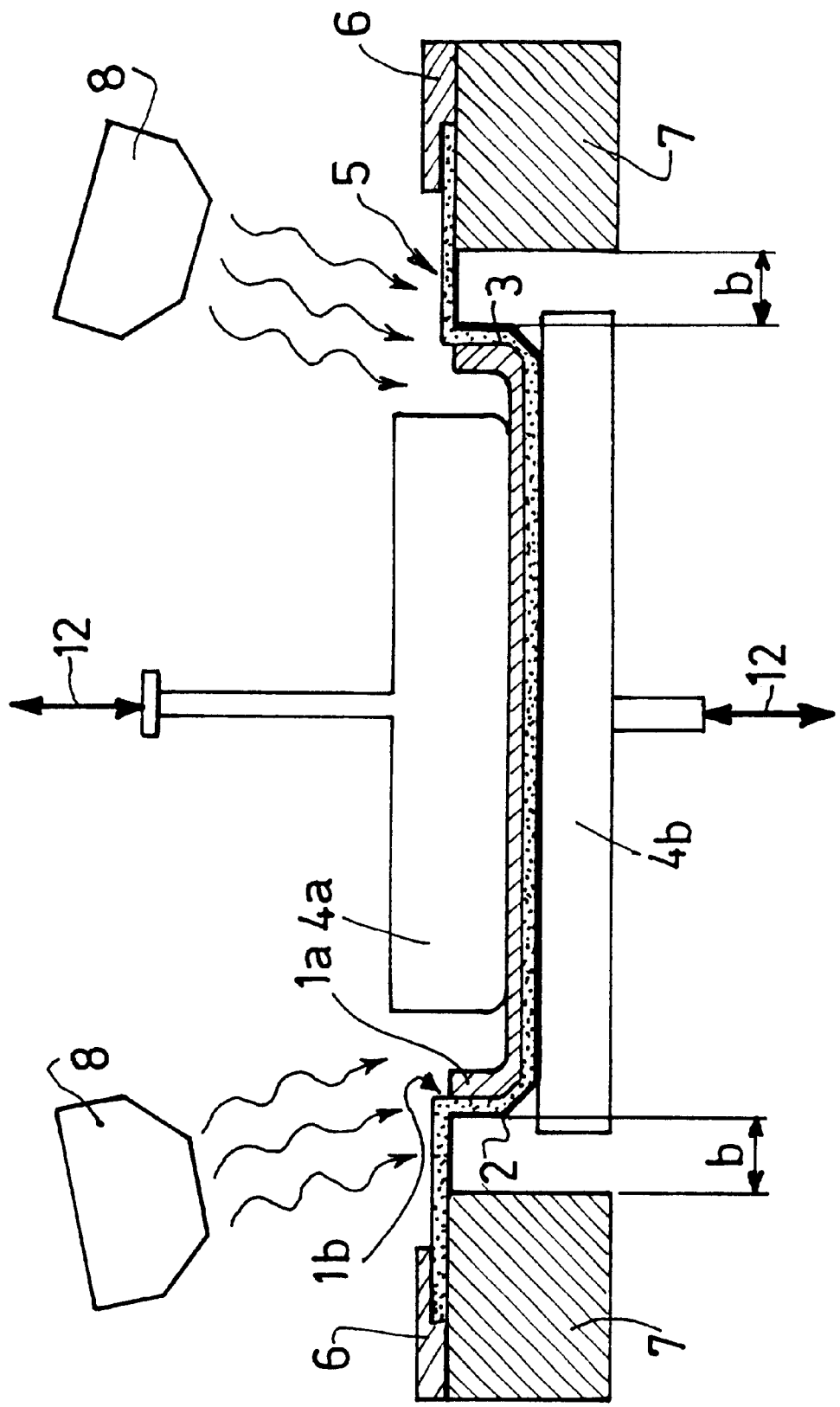
FIG. 4, a modified device in a working position
Figure 5:
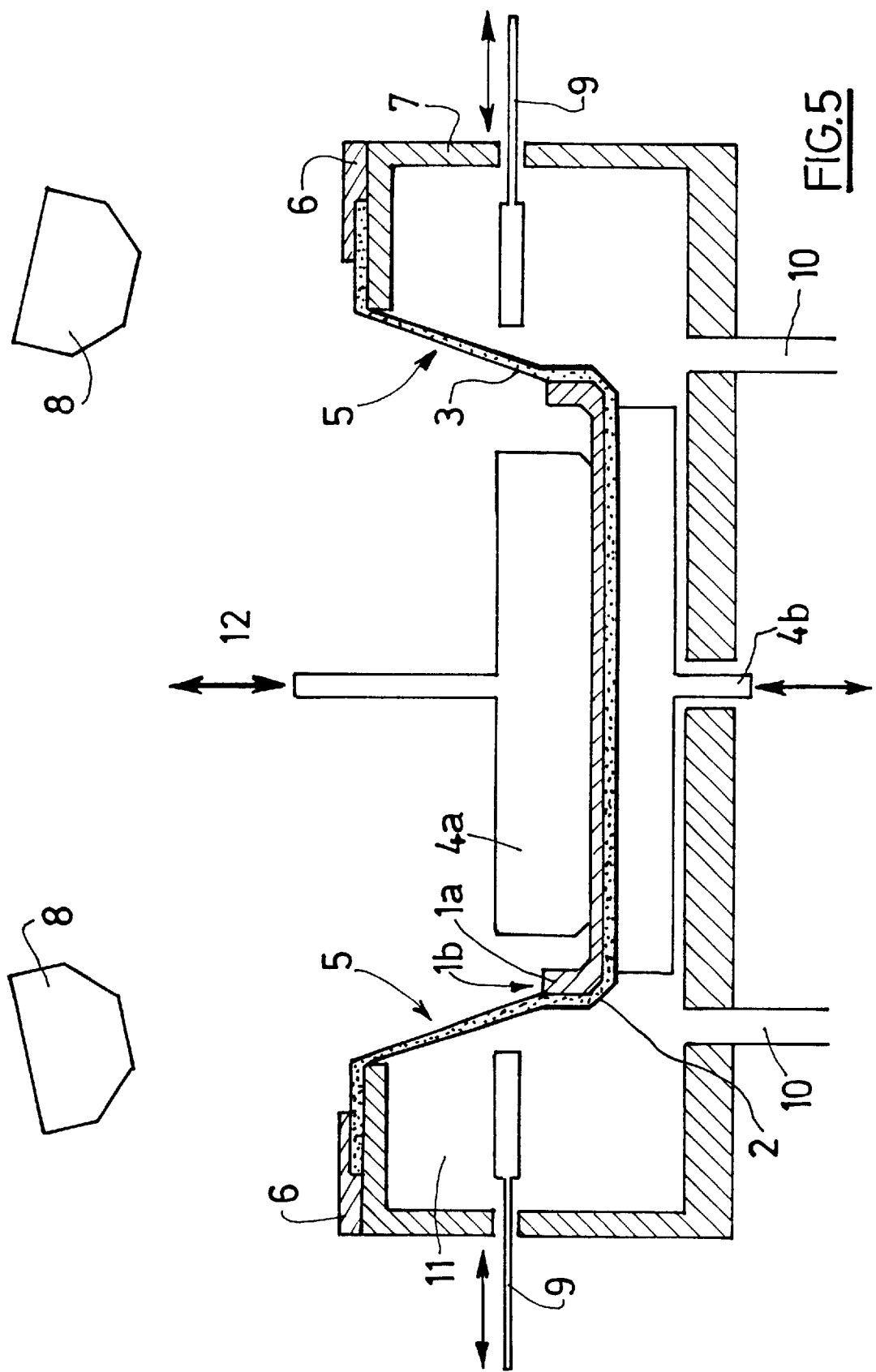
FIG. 5, the device of FIG. 4 after an other modification in a working position.

FIGS. 4 and 5 show a modified arrangement of the invention. A part 1, which must be coated with a sheet of ornament and a back of foam, lies on the plate 4b, and the sheet 2 and the back of foam 3 are maintained by their edge and are stretched by the grips 6 on the table 7. A second plate 4a which is shaped as a punch is brought above the inner face of the part 1. Thus, the plastic material of the part 1 is protected from effects on the energizing irradiation enabling to reduce the ornamental material in thickness. Reduction in thickness of the back of foam 3 is obtained in the zone 5 with help of one or a plurality of energy sources 8.

By a simultaneous confinement of the part 1 with help of the two plates 4a, 4b, the thickness of the back of foam 3 and sheet 2 is further reduced.

During or after the forming step, a possible hollow chamber 11 (FIG. 5) may be used between the part 1, the back of foam 3, the ornamental material 2 and the table 7 of the machine for providing a pressure or a suction during and/or after the forming step, the foam and sheet thickness being further reduced.

Simultaneously to, or after the forming step, angles or particular outlines may be formed with help of the slide members 9 and the lining, respectively the bending of the ornament around the edge, and the thickness of the ornamental material is further reduced. Thus, in the angle region, a preformed lining of the part will exist, which makes a trimming cut unnecessary.

As a support plastic material, it is possible to use all thermoplastic or thermosetting materials. By using polyolefins, upon a heat treatment, the material is becoming active and makes thus possible a soldering or a gluing without any other prior treatment.

It is obvious that various variants of embodiment may be provided, in particular by substitution of equivalent technical means, without therefor departing from the scope of the invention as shown by the appended claims.

What is claimed is:

1. A process for manufacturing an ornamented part wherein a multilayer ornament formed of a back of foam and a sheet of ornament, is brought on a support portion of the ornamented part, so as to surround an edge region thereof, wherein:

in a first step, the sheet of ornament is brought onto the ornamented part and is maintained in at least one said edge region;

then, in a second step, a thickness of the foam is reduced by at least one of heating and stretching in a zone of the edge region; and in a third step, one of said multilayer ornament and at least a projecting part of the sheet of the ornament is bent around at least at one said edge region of the part.

2. The process as set forth in claim 1, wherein the back of foam has a thickness at rest between 0.5 and 5 mm.

3. The process as set forth in claim 1, wherein the thickness of the foam in the zone is reduced by at least one of application of a laser, high frequency radiation, heating and/or stretching.

4. The process as set forth in claim 1, wherein the ornament is stretched at least at one of before the third step and during the third step.

5. The process as set forth in claim 4, wherein the ornament is stretched in a region of one of an angle and an outline of said part.

6. The process as set forth in claim 1, wherein the back of foam is subjected, during the third step, to at least one of a suction on a foam side of the ornament, a pressure on a sheet side of the ornament, and a mechanical stretching.

7. The process as set forth to claim 1, wherein the zone of the edge region of the ornament is stretched before the second and third steps.

8. The process as set forth in claim 1, wherein the ornament is heated and stretched between the support portion and the zone of the ornament by means of a relative movement in the edge region of the edge.

9. A process for manufacturing an ornamented part wherein a multilayer ornament formed of a back of foam and a sheet of ornament, is brought on a support portion of the ornamented part, so as to surround an edge region thereof, wherein:

in a first step, the sheet of multilayer ornament is brought onto the ornamented part and is maintained in at least one said edge region;

then, in a second step, a thickness of the foam is reduced by at least one of heating and stretching in a zone of the edge region;

in a third step, one of said multilayer ornament and at least a projecting part of the sheet of the ornament is fixed onto at least one said edge region of the part; and, wherein at least one of the multilayer ornament and the projecting part of the sheet of ornament is lined in the edge region with a maximum radius of 2 mm.

* * * * *

UNITED STATES PATENT AND TRADEMARK OFFICE
CERTIFICATE OF CORRECTION

PATENT NO. : 6,508,973 B2
DATED : January 21, 2003
INVENTOR(S) : Andreas Beckmann and Eric Lecomte It is certified that error appears in the above-identified patent and that said Letters Patent is hereby corrected as shown below:

<u>Title page,</u>
Item [57], ABSTRACT, please delete the ABSTRACT and replace it with the following:

-- A multilayer ornament, that is formed of a back of foam and a sheet of ornament, is brought on a support portion of the part, so as to surround the edge region. In a first step, the ornament is brought onto the part and is maintained in at least one such edge region. Then, in a second step, the thickness of the foam is reduced by heating in the edge zone and or stretching. And, in a third step, the ornament assembly or the projecting sheet of ornament is turned along and fixed onto at least one edge of the part. --

Signed and Sealed this

Third Day of June, 2003

JAMES E. ROGAN
*Director of the United States Patent and Trademark Office*